(12) United States Patent
Grigsby et al.

(10) Patent No.: US 9,106,745 B2
(45) Date of Patent: Aug. 11, 2015

(54) VOICE RESPONSE UNIT HARVESTING

(75) Inventors: Travis M. Grigsby, Austin, TX (US);
Frank L. Jania, Chapel Hill, NC (US);
Steven M. Miller, Cary, NC (US); Lisa Seacat DeLuca, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1217 days.

(21) Appl. No.: 12/211,653

(22) Filed: Sep. 16, 2008

(65) Prior Publication Data
US 2010/0067670 A1  Mar. 18, 2010

(51) Int. Cl.
H04M 3/493 (2006.01)
H04M 1/725 (2006.01)
G06Q 40/00 (2012.01)
H04M 1/253 (2006.01)

(52) U.S. Cl.
CPC ............ *H04M 3/493* (2013.01); *G06Q 40/00* (2013.01); *H04M 1/2535* (2013.01); *H04M 1/72522* (2013.01); *H04M 2203/25* (2013.01)

(58) Field of Classification Search
CPC ............ H04M 3/493; H04M 2203/25; H04M 1/72522; H04M 1/2535; G06Q 40/00
USPC ........ 379/88.18, 88.23, 221.09, 88.13, 88.17, 379/265.09; 704/270.1; 709/219, 227
See application file for complete search history.

(56) References Cited

U.S. PATENT DOCUMENTS

| | | | |
|---|---|---|---|
| 5,561,703 A | 10/1996 | Arledge et al. | |
| 5,802,526 A | 9/1998 | Fawcett et al. | |
| 5,864,605 A | 1/1999 | Keshav | |
| 5,946,377 A * | 8/1999 | Wolf | 379/88.22 |
| 6,016,336 A | 1/2000 | Hanson | |
| 6,058,179 A | 5/2000 | Shaffer et al. | |
| 6,091,805 A | 7/2000 | Watson | |
| 6,131,810 A | 10/2000 | Weiss et al. | |
| 6,354,490 B1 | 3/2002 | Weiss et al. | |
| 6,412,073 B1 * | 6/2002 | Rangan | 726/5 |
| 6,754,332 B1 | 6/2004 | Kneipp et al. | |
| 6,788,770 B1 * | 9/2004 | Cook et al. | 379/100.01 |
| 6,999,448 B1 | 2/2006 | Klein | |
| 7,065,188 B1 * | 6/2006 | Mei et al. | 379/88.23 |
| 7,092,509 B1 | 8/2006 | Mears et al. | |

(Continued)

FOREIGN PATENT DOCUMENTS

| | | |
|---|---|---|
| KR | 20000072653 | 12/2000 |
| KR | 10-0451097 | 12/2004 |

OTHER PUBLICATIONS

United States Patent and Trademark Office, Notice of Allowance for U.S. Appl. No. 13/590,641, Sep. 11, 2013, pp. 1-9, Alexandria, VA, USA.

(Continued)

*Primary Examiner* — Lisa Hashem (74) *Attorney, Agent, or Firm* — Lee Law, PLLC; Christopher B. Lee (57) ABSTRACT

A system, method and program product for providing voice response unit (VRU) harvesting. A system is provided that includes: an account management system for allowing a user to identify a set of VRUs and associated data desired from each VRU; a navigation system for automatically navigating each VRU and collecting the desired data from each VRU; and an output system for outputting the desired data for the user.

18 Claims, 4 Drawing Sheets

(56) References Cited

U.S. PATENT DOCUMENTS

| | | |
|---|---|---|
| 7,113,200 B2 | 9/2006 | Eshkoli |
| 7,180,985 B2 * | 2/2007 | Colson et al. ............. 379/88.16 |
| 7,215,743 B2 | 5/2007 | Creamer et al. |
| 7,224,790 B1 | 5/2007 | Bushey et al. |
| 7,272,212 B2 | 9/2007 | Eberle et al. |
| 7,340,040 B1 | 3/2008 | Saylor et al. |
| 7,386,103 B1 | 6/2008 | Chahal |
| 7,509,266 B2 | 3/2009 | Rogers et al. |
| 7,515,695 B1 * | 4/2009 | Chan et al. ............... 379/88.18 |
| 7,715,531 B1 | 5/2010 | Golding et al. |
| 7,715,547 B2 * | 5/2010 | Ibbotson et al. ......... 379/265.02 |
| 7,742,580 B2 * | 6/2010 | Cooper et al. ............ 379/88.22 |
| 7,773,731 B2 | 8/2010 | Malik et al. |
| 7,778,397 B2 | 8/2010 | Erhart et al. |
| 7,809,376 B2 | 10/2010 | Letourneau et al. |
| 7,881,443 B2 | 2/2011 | Langseth et al. |
| 7,961,088 B2 | 6/2011 | Watts et al. |
| 8,009,813 B2 | 8/2011 | Chang |
| 8,036,348 B2 | 10/2011 | Kortum et al. |
| 8,050,392 B2 | 11/2011 | Adams et al. |
| 8,051,369 B2 | 11/2011 | Zirngibl et al. |
| 8,054,952 B1 | 11/2011 | Or-Bach et al. |
| 8,073,112 B2 * | 12/2011 | Jaiswal et al. ............ 379/88.04 |
| 8,094,788 B1 | 1/2012 | Eberle et al. |
| 8,130,918 B1 | 3/2012 | Zirngibl et al. |
| 8,131,524 B2 | 3/2012 | Bushey et al. |
| 8,189,756 B2 | 5/2012 | Bhogal et al. |
| 8,229,091 B2 | 7/2012 | Romeo |
| 8,243,900 B2 | 8/2012 | Kumhyr |
| 8,265,234 B2 | 9/2012 | Singh |
| 8,340,257 B1 | 12/2012 | Paczkowski et al. |
| 8,406,388 B2 * | 3/2013 | Or-Bach et al. ........... 379/88.13 |
| 8,494,139 B2 | 7/2013 | Byrne et al. |
| 8,599,836 B2 * | 12/2013 | Van Buren et al. ........... 370/352 |
| 8,687,777 B1 * | 4/2014 | Lavian et al. .............. 379/88.18 |
| 8,718,239 B1 * | 5/2014 | Madhavapeddi et al. .. 379/88.01 |
| 2003/0074091 A1 | 4/2003 | Kim |
| 2003/0099335 A1 | 5/2003 | Tanaka et al. |
| 2003/0161449 A1 * | 8/2003 | Plan ......................... 379/88.18 |
| 2004/0093211 A1 * | 5/2004 | Reynolds et al. ............ 704/235 |
| 2004/0122941 A1 * | 6/2004 | Creamer et al. .............. 709/224 |
| 2004/0176958 A1 | 9/2004 | Salmenkaita et al. |
| 2005/0081152 A1 | 4/2005 | Commarford et al. |
| 2005/0147219 A1 * | 7/2005 | Comerford ................. 379/88.18 |
| 2005/0201544 A1 * | 9/2005 | Book et al. ..................... 379/219 |
| 2006/0245557 A1 | 11/2006 | Paden et al. |
| 2006/0285657 A1 | 12/2006 | Lippke et al. |
| 2007/0024454 A1 | 2/2007 | Singhal |
| 2007/0081655 A1 | 4/2007 | Sun et al. |
| 2007/0135101 A1 | 6/2007 | Ramati et al. |
| 2008/0039010 A1 * | 2/2008 | Vance et al. .................. 455/3.06 |
| 2008/0046363 A1 * | 2/2008 | Ali et al. .......................... 705/40 |
| 2008/0249936 A1 * | 10/2008 | Miller et al. .................... 705/40 |
| 2008/0298560 A1 | 12/2008 | Purdy et al. |
| 2008/0304632 A1 * | 12/2008 | Catlin et al. ............... 379/88.04 |
| 2009/0042539 A1 | 2/2009 | Jiang et al. |
| 2009/0048864 A1 | 2/2009 | Koslowski et al. |
| 2009/0094283 A1 | 4/2009 | Baudisch et al. |
| 2009/0268883 A1 * | 10/2009 | Agapi et al. ............... 379/88.04 |
| 2010/0054430 A1 * | 3/2010 | Grigsby et al. ............ 379/88.03 |
| 2010/0057456 A1 * | 3/2010 | Grigsby et al. ................ 704/235 |
| 2010/0088613 A1 * | 4/2010 | DeLuca et al. ................. 715/746 |
| 2010/0185449 A1 * | 7/2010 | Wu et al. ........................ 704/275 |
| 2010/0310059 A1 * | 12/2010 | Davis et al. ................ 379/88.18 |
| 2011/0173119 A1 * | 7/2011 | Kumar et al. .................... 705/40 |
| 2012/0041775 A1 * | 2/2012 | Cosentino et al. ................ 705/2 |
| 2013/0022181 A1 * | 1/2013 | Or-Bach et al. ............ 379/88.11 |
| 2013/0108030 A1 * | 5/2013 | Snir et al. .................. 379/88.01 |
| 2013/0301814 A1 * | 11/2013 | Berger et al. ............. 379/88.01 |
| 2014/0029473 A1 * | 1/2014 | Riley et al. ..................... 370/259 |
| 2014/0112465 A1 * | 4/2014 | Sartini ....................... 379/265.09 |
| 2014/0122053 A1 * | 5/2014 | Lotan et al. ......................... 704/2 |
| 2014/0222503 A1 * | 8/2014 | Vijayaraghavan et al. .. 705/7.29 |
| 2014/0233711 A1 * | 8/2014 | Davis et al. ................ 379/88.01 |
| 2014/0241513 A1 * | 8/2014 | Springer .................... 379/88.01 |
| 2014/0329514 A1 * | 11/2014 | Meriaz et al. ................. 455/418 |
| 2014/0331177 A1 * | 11/2014 | Bi et al. ........................ 715/810 |

OTHER PUBLICATIONS

United States Patent and Trademark Office, Office Action for U.S. Appl. No. 12/202,682, Jun. 12, 2012, pp. 1-13, Alexandria, VA, USA.

United States Patent and Trademark Office, Office Action for U.S. Appl. No. 12/202,682, Mar. 2, 2012, pp. 1-7, Alexandria, VA, USA.

United States Patent and Trademark Office, Office Action for Application No. 13/590,641, Mar. 25, 2013, pp. 1-17, Alexandria, VA, USA.

* cited by examiner

John Smith                                           50

Provider 1: Credit Card for Bank A

Balance: $2100
       Payment Due Date: 9/01/2010
       Minimum Payment: $185.00

Provider 2: XYZ Insurance Company

Payment Due Date: 9/14/2010
       Amount Due: $457.00

Provider 3: PDQ Leasing Company

Payment Due Date: 9/18/2010
       Amount Due: $520.00
       Number of Payments Left: 8

FIG. 4

VOICE RESPONSE UNIT HARVESTING

CROSS-REFERENCE TO RELATED APPLICATION

This application is related to co-pending application titled "VOICE RESPONSE UNIT MAPPING," filed on Sep. 2, 2008, Ser. No. 12/202,691, and co-pending application titled "VOICE RESPONSE UNIT SHORTCUTTING," filed on Sep. 2, 2008, Ser. No. 12/202,682, the contents of which are hereby incorporated by reference. This application is further related to co-pending application titled "VOICE RESPONSE UNIT PROXY UTILIZING DYNAMIC WEB INTERACTION," filed on Oct. 3, 2008, Ser. No. 12/245,212.

FIELD OF THE INVENTION

This disclosure relates to voice response unit (VRU) telephony, and more particularly to a system and method for providing a VRU harvesting service for end-users.

BACKGROUND OF THE INVENTION

In telephony, interactive voice response (IVR) provides a phone technology that allows a computer or voice response unit (VRU) to detect voice and touch tones using a normal phone call. The VRU can respond with pre-recorded or dynamically generated audio to further direct callers on how to proceed. VRUs can be used to control almost any function where the interface can be broken down into a series of simple menu choices or options. Once constructed, VRUs generally scale well to handle large call volumes.

In operation, a caller dials a telephone number that is answered by the VRU. The VRU executes an application which is tied to the number dialed DNIS (Dialed Number Identification Service). As part of the application, prerecorded audio files or dynamically generated Text to Speech (TTS) audio explain the options available to the caller. The caller is given the choice to select options using DTMF tones or spoken words. Speech recognition may be used to carry out more complex transactions and simplifies the application menu structure.

Unfortunately, interfacing with a VRU can be annoying for people as the presentation of information is inherently slow. Moreover, gathering information, such as balance information or payment due dates, from multiple companies that utilize VRUs requires a significant amount of user interaction. Accordingly, there is a need in the art for allowing users to more effectively harvest data from VRUs.

SUMMARY OF THE INVENTION

The present invention relates to a system, method and program product for providing VRU harvesting. In one embodiment, there is a system for harvesting voice response unit (VRU) data, comprising: an account management system for allowing a user to identify a set of VRUs and associated data desired from each VRU; a navigation system for automatically navigating each VRU and collecting the desired data from each VRU; and an output system for outputting the desired data for the user.

In a second embodiment, there is a computer readable medium having a program product stored therein for providing voice response unit (VRU) harvesting, comprising: program code for allowing a user to identify a set of VRUs and associated data desired from each VRU; program code for automatically navigating each VRU and collecting the desired data from each VRU; and program code for outputting the desired data for the user.

In a third embodiment, there is a method of providing voice response unit (VRU) harvesting, comprising: providing an interface for allowing a user to identify a set of VRUs and associated data desired from each VRU; automatically navigating each VRU and collecting the desired data from each VRU; and outputting the desired data for the user.

In a fourth embodiment, there is a method for deploying a system for providing voice response unit (VRU) harvesting, comprising: providing a computer infrastructure being operable to: provide an interface for allowing a user to identify a set of VRUs and associated data desired from each VRU; automatically navigate each VRU and collecting the desired data from each VRU; and output the desired data for the user.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Figure 1:
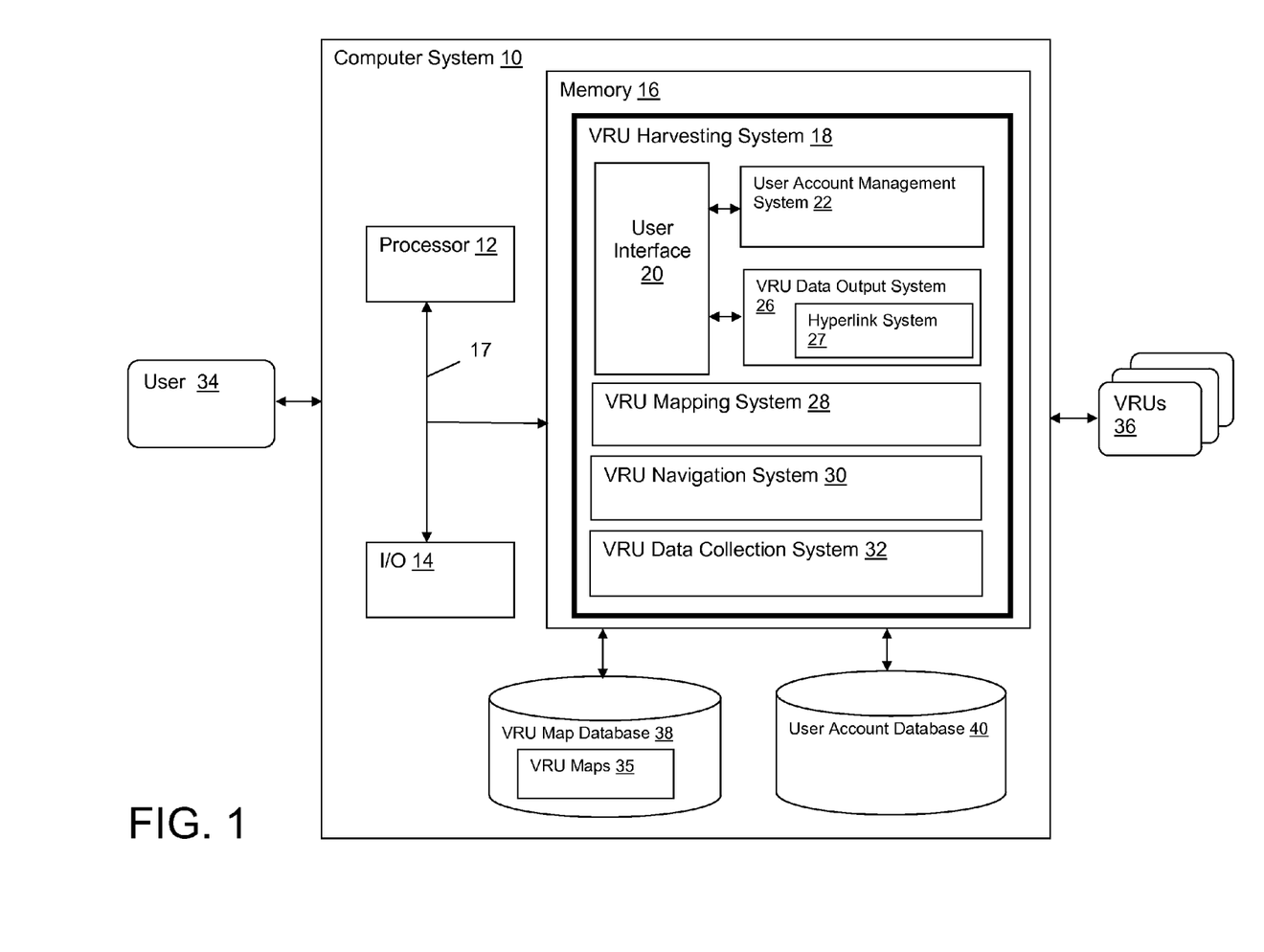
FIG. 1 depicts a computer system having a VRU harvesting system in accordance with an embodiment of the present invention.

Referring to FIG. 1, a computer system 10 is shown having a VRU (voice response unit) harvesting system 18 that automatically harvests desired data from one or more VRUs 36 for a user 34. Data is collected periodically in an automated fashion and is then provided back the user 34, e.g., via a web portal, texting, phone call, email, smart phone, handheld device, etc. Thus, information such as account balances, payment amounts and due dates, etc., from a plurality of providers is automatically harvested (via a respective VRU) and made available to the user 34 without the need to directly interface with the VRUs 36.

VRU harvesting system 18 includes a user interface 20 that allows user 34 to access a user account management system 22, in which the user 34 can sign up for the harvesting service and manage a user account. More particularly, user account management system 22 allows the user 34 to identify which providers/VRUs to harvest data from, how often it should be harvested or outputted, and what specific types of data are desired. For instance, user 34 may have several credit cards and wants to know the balance, payment amount and due date for each every Monday. User account management system 22 may for instance include a graphical user interface (GUI) for setting up or modifying the user account to make such selections, e.g., using dropdown menus, dialog windows, radio buttons, etc. The resulting selections are then stored in a user account database 40. User information specific to each VRU 36, such as account data, passwords, date of birth, etc., can likewise be collected by account management system 22 and stored in the user account database 40.

User interface 20 also provides a conduit through which VRU data output system 26 can provide the collected data back to the user. This can be done in any manner using any format, e.g., via a web portal using HTML, email using plain text, a telephone call using voice synthesis, etc. The format and conduit through which desired data is presented back to the user 34 may be configured in the user account management system 22. Collected data may be stored temporarily or permanently in the user account database 40 or other location such that it can be made available for output back the user 34.

VRU harvesting system 18 utilizes a VRU map database 38 that includes a VRU map 35 of each VRU 36 targeted by the harvesting service. Each VRU map 35 is essentially a hierarchical representation of the options and functions associated with a given VRU 36. An example VRU map 35 is shown below in FIG. 2. In the event a VRU map 35 does not exist for a selected VRU 36, VRU mapping system 28 can be utilized to build a new VRU map 35. VRU maps 35 can be collected or built in any manner. Related case, VOICE RESPONSE UNIT MAPPING, filed on Sep. 2, 2008, Ser. No. 12/202,691, describes an illustrative process for automatically building VRU maps 35. VRU maps 35 can also be periodically updated by VRU mapping system 28 (e.g., once a month or upon an interrogation error) to ensure their accuracy.

VRU navigation system 30 provides a mechanism for automatically navigating a VRU 36 based on an associated VRU map 35. Namely, by indentifying where a desired option or node exists in a VRU map 35, VRU navigation system 30 can calculate a path to the node and ascertain what inputs are required to reach the node. Once the path and associated inputs is calculated, VRU navigation system 30 initiates a call with the targeted VRU 36 and then begins navigating the VRU 36 along the path to obtain the required data. When navigation inputs are required by the VRU 36 to proceed (e.g., "enter 1 for accounts"), the VRU navigation system 30 simply generates the necessary input to proceed based on pre-calculated path. When user information is required by the VRU 36 (e.g., "please enter your account number"), the information is retrieved from the user account database 40. Data may be entered into the VRU 36, e.g., by generating tones or via a text to voice generation system that speaks the information. In some instances, a speech recognition system may be employed to determine what user information is required in a dynamic manner.

Accordingly, if an account balance is desired from a bank VRU 36, VRU navigation system 30 will calculate a path through the bank VRU 36 based on the VRU map 35, automatically entering the appropriate inputs, account numbers, etc., to reach the appropriate option and obtain the desired data. Once the appropriate node in the VRU 36 is reached by the VRU navigation system 30, VRU data collection system 32 records the desired data and stores the information in the user account database 40. Speech recognition can for example be utilized to convert spoken information into textual data. An illustrative navigation system is described in related case, VOICE RESPONSE UNIT SHORTCUTTING, filed on Sep. 2, 2008, Ser. No. 12/202,682.

As noted, VRU data output system 26 may then be utilized to output the data to the user 34. Data may be formatted in any manner for the user 34, e.g., in a calendar, table, graph, etc. Moreover, a hyperlink system 27 may be utilized to allow the user 34 to select a particular piece of data, e.g., on a smart phone. Once selected, hyperlink system 27 will automatically navigate to the associated option on the corresponding VRU 36. This thus allows the user 34 to quickly verify the data.

Figure 2:
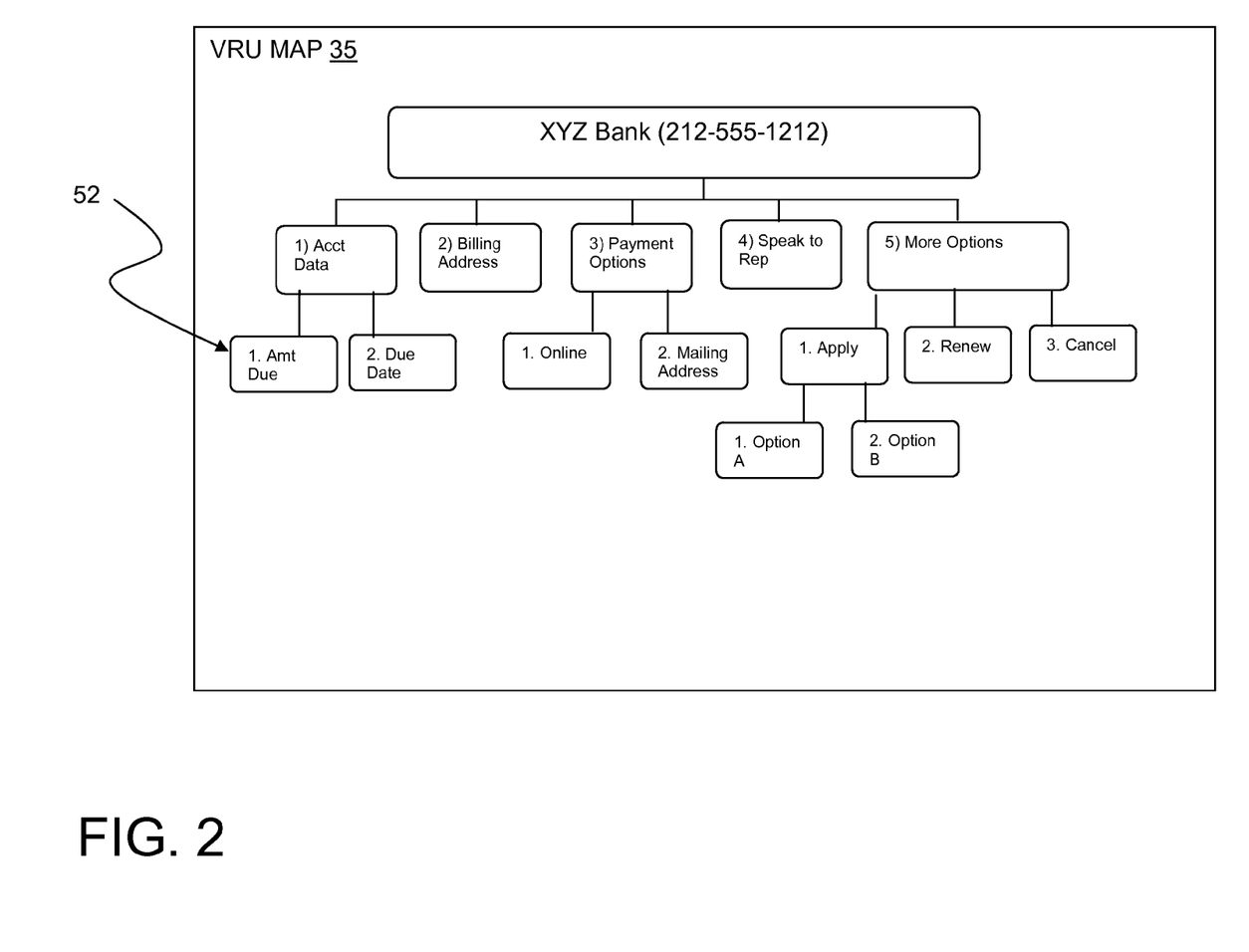
FIG. 2 depicts a VRU map in accordance with an embodiment of the present invention.

FIG. 2 depicts a pictorial representation of a VRU map 35. In this example, various VRU options or nodes are depicted in a hierarchical fashion. Using the VRU map 35, a path can be readily calculated to obtain a desired result, such as determining an amount due. Because the path is pre-calculated, there is no need for VRU navigation system 30 to interpret the various options at each hierarchical level in the VRU 36. Instead, VRU navigation system 30 knows ahead of time that, e.g., "Amount Due" node 52 can be reached by dialing the number, entering option 1, for "Account Data," entering the user account information when prompted, and then entering option 1 again for amount due. It is understood that VRU map 35 shown in FIG. 2 is for illustrative purposes only, and the exact form and type of information stored in the map will depend on the particular application. For instance, the map could be stored in a tabular format with indicators that determine when user information is required.

Figure 3:
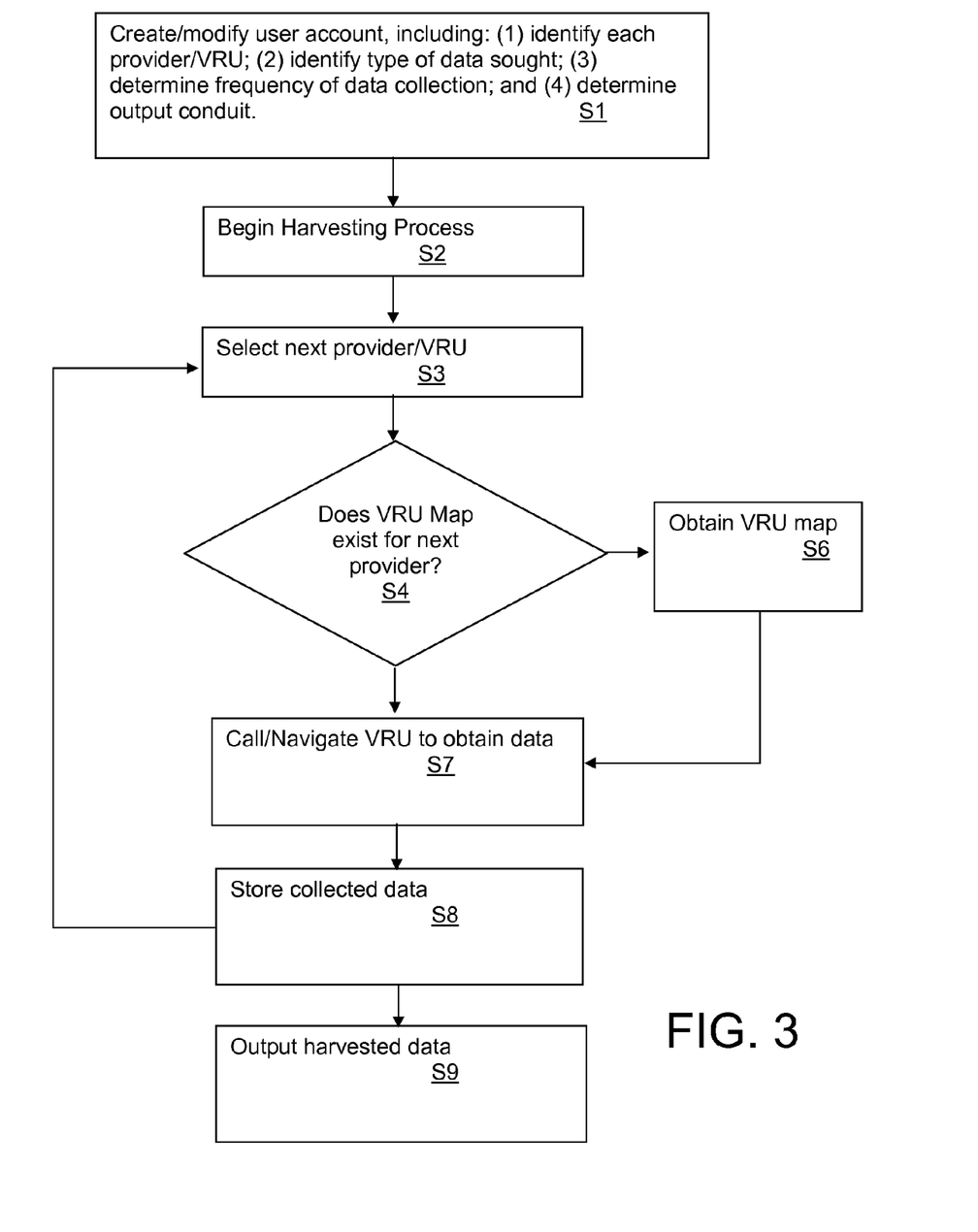
FIG. 3 depicts a flow chart showing a method in accordance with an embodiment of the present invention.

FIG. 3 depicts a flow diagram of a method of implementing VRU harvesting system 18. At S1, a user account is created or modified via the user account management system 22 (FIG. 1). This includes, e.g., identifying each provider/VRU from which data is desired; the type of data being sought from each provider; the frequency of the data collection/output; and how the data is to be output, i.e., what type of conduit is to be used for the user. At S2, the harvesting process begins, e.g., based on an inputted or default start time. A next provider/VRU is selected at S3, and a check is made to see if a VRU map exists for the provider at S4. If the VRU map exists, then the VRU is called and navigated to obtain the desired data at S7. If a VRU map does not exist, a VRU map is obtained at S6, e.g., using an automated mapping process. At S8, the collected data is stored, and a next provider/VRU is selected at S3. After all of the providers/VRUs have been processed, the harvested data can be outputted at S9, e.g., at a predetermined time.

Figure 4:
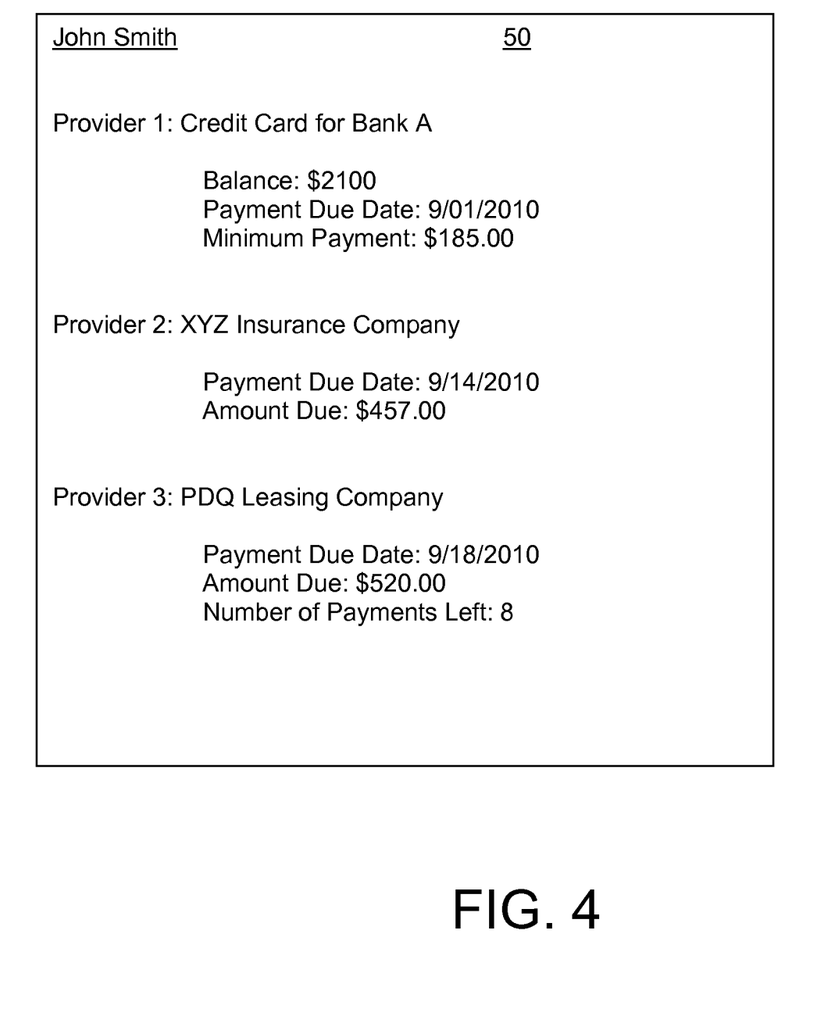
FIG. 4 depicts an output of desired VRU data in accordance with an embodiment of the present invention.

FIG. 4 depicts an illustrative output 50 for a fictitious user John Smith. In this example, VRUs from three providers are interrogated to obtain data. As can be seen, provider 1 reports a balance, payment due date and minimum payment; provider 2 reports a payment due date and amount due; and provider 3 reports a payment due date, amount due, and number of payments left. As noted above, a hyperlink system 27 (FIG. 1) may be utilized to allow the user to select a data item in the output and be automatically connected (e.g., with a smart phone) to an associated node in the corresponding VRU. Any hyper-linking to telephony technology may be utilized to implement this feature. It is understood that the format and type of information shown in FIG. 4 is for illustrative purposes only, and any type of format or data could be contained in output 50.

Referring again to FIG. 1, it is understood that computer system 10 may be implemented as any type of computing infrastructure. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a VRU harvesting system 18 could be created, maintained and/or deployed by a service provider that offers the functions described herein for customers. That is, a service provider could offer to deploy or provide VRU shortcuts as described above.

It is understood that in addition to being implemented as a system and method, the features may be provided as a program product stored on a computer-readable medium, which when executed, enables computer system 10 to provide a VRU harvesting system 18. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for harvesting voice response unit (VRU) data, comprising:
    an account management system that allows a user to identify a set of VRUs and specified types of account data desired from each VRU;
    a VRU mapping system that creates and stores a VRU map of each VRU of the set of VRUs in a VRU Map database;
    a navigation system that:
        calculates, using each VRU map, a VRU path within each VRU and inputs used to reach each specified type of account data desired by the user from each of the respective set of VRUs; and
        automatically navigates each calculated VRU path of each VRU and collects account data of each specified type of account data from each VRU;
    an output system that outputs the collected account data for the user; and
    a hyperlink system that automatically connects, responsive to the user selecting a collected account data item in the collected account data output, to an associated node in a corresponding VRU and that allows the user to verify the collected account data item.

2. The system of claim 1, where:
    the account management system utilizes a graphical user interface that allows the user to select a frequency at which the account data of the specified type of account data is collected or outputted; and
    where the user has selected the frequency at which the account data of the specified type of account data is collected, the navigation system automatically navigates each calculated VRU path of each VRU and collects the account data of each specified type of account data from each VRU at the user-selected frequency; and
    where the user has selected the frequency at which the account data of the specified type of account data is outputted, the output system outputs the collected account data for the user at the user-selected frequency.

3. The system of claim 1, where the collected account data is output via a conduit selected from a group consisting of: an email message, a text message, a web portal, a smart phone, a handheld device, and a telephone.

4. The system of claim 1, a where the mapping system periodically updates the VRU map of each VRU in the VRU Map database.

5. The system of claim 1, further comprising a user account database that stores account information for the user.

6. The system of claim 1, where the navigation system comprises a speech recognition system that facilitates navigation of each VRU.

7. A computer program product comprising a non-transitory computer readable storage medium having computer readable program code stored therein for providing voice response unit (VRU) harvesting, where the computer readable program code when executed on a computer causes the computer to perform a method comprising:
    allowing, by an account management system, a user to identify a set of VRUs and specified types of account data desired from each VRU;
    creating and storing, by a VRU mapping system, a VRU map of each VRU of the set of VRUs in a VRU Map database;
    by a navigation system:
    calculating, using each VRU map, a VRU path within each VRU and inputs used to reach each specified type of account data desired by the user from each of the respective set of VRUs; and
    automatically navigating each calculated VRU path of each VRU and collect account data of each specified type of account data from each VRU;
    outputting, by an output system, the collected account data for the user; and
    automatically connecting, by a hyperlink system responsive to the user selecting a collected account data item in the collected account data output, to an associated node in a corresponding VRU and allow the user to verify the collected account data item.

8. The computer program product of claim 7, where:
    the computer readable program code further provides a graphical user interface that when executed on the computer causes the computer to perform the method comprising allowing the user to select a frequency at which the account data of the specified type of account data is collected or outputted; and
    where the user has selected the frequency at which the account data of the specified type of account data is collected, in causing the computer to perform the method comprising automatically navigating, by the navigation system, each calculated VRU path of each VRU and collect the account data of each specified type of account data from each VRU, the computer readable program code when executed on the computer causes the computer to perform the method comprising:
    automatically navigating, by the navigation system, each calculated VRU path of each VRU and collect the account data of each specified type of account data from each VRU at the user-selected frequency; and
    where the user has selected the frequency at which the account data of the specified type of account data is outputted, in causing the computer to perform the method comprising outputting, by the output system, the collected account data for the user, the computer readable program code when executed on the computer causes the computer to perform the method comprising:
    outputting, by the output system, the collected account data for the user at the user-selected frequency.

9. The computer program product of claim 7, where the collected account data is output via a conduit selected from a group consisting of: an email message, a text message, a web portal, a smart phone, a handheld device, and a telephone.

10. The computer program product of claim 7, where the computer readable program code when executed on the computer further causes the computer to perform the method comprising periodically updating the VRU map of each VRU in the VRU Map database.

11. The computer program product of claim 7, where the computer readable program code when executed on the computer further causes the computer to perform the method comprising accessing and storing account information for the user in a user account database.

12. The computer program product of claim 7, where the computer readable program code when executed on the computer further causes the computer to perform the method comprising performing speech recognition that facilitates navigation of each VRU.

13. A computer-implemented method of providing voice response unit (VRU) harvesting, comprising:
    providing an interface that allows a user to identify a set of VRUs and specified types of account data desired from each VRU;
    creating and storing, by a VRU mapping system, a VRU map of each VRU of the set of VRUs in a VRU Map database;
    by a navigation system:
    calculating, using each VRU map, a VRU path within each VRU and inputs used to reach each specified type of account data desired by the user from each of the respective set of VRUs; and
    automatically navigating each calculated VRU path of each VRU and collecting account data of each specified type of account data from each VRU;
    outputting, by an output system, the collected account data for the user; and
    automatically connecting, by a hyperlink system responsive to the user selecting a collected account data item in the collected account data output, to an associated node in a corresponding VRU and allowing the user to verify the collected account data item.

14. The computer-implemented method of claim 13, further comprising:
    providing a graphical user interface that allows the user to select a frequency at which the account data of the specified type of account data is collected or outputted; and
    where the user has selected the frequency at which the account data of the specified type of account data is collected, automatically navigating, by the navigation system, each calculated VRU path of each VRU and collecting the account data of each specified type of account data from each VRU comprises:
    automatically navigating, by the navigation system, each calculated VRU path of each VRU and collecting the account data of each specified type of account data from each VRU at the user-selected frequency; and
    where the user has selected the frequency at which the account data of the specified type of account data is outputted, outputting, by the output system, the collected account data for the user comprises:
    outputting, by the output system, the collected account data for the user at the user-selected frequency.

15. The computer-implemented method of claim 13, where the collected account data is output via a conduit selected from a group consisting of: an email message, a text message, a web portal, a smart phone, a handheld device, and a telephone.

16. The computer-implemented method of claim 13, further comprising:
   periodically updating the VRU map of each VRU in the VRU Map database; and
   storing account information for the user in a user account database.

17. The computer-implemented method of claim 13, further comprising performing speech recognition that facilitates navigation of each VRU.

18. A computer-implemented method for deploying a system for providing voice response unit (VRU) harvesting, comprising:
   providing a computer infrastructure being operable to:
   provide an interface that allows a user to identify a set of VRUs and specified types of account data desired from each VRU;
   create and store, by a VRU mapping system, a VRU map of each VRU of the set of VRUs in a VRU Map database;
   by a navigation system:
   calculate, using each VRU map, a VRU path within each VRU and inputs used to reach each specified type of account data desired by the user from each of the respective set of VRUs; and
   automatically navigate each calculated VRU path of each VRU and collect account data of each specified type of account data from each VRU;
   output, by an output system, the collected account data for the user; and
   automatically connect, by a hyperlink system responsive to the user selecting a collected account data item in the collected account data output, to an associated node in a corresponding VRU and allow the user to verify the collected account data item.

\* \* \* \* \*